(12) United States Patent
Bertz et al.

(10) Patent No.: US 11,602,003 B1
(45) Date of Patent: Mar. 7, 2023

(54) WIRELESS COMMUNICATION NETWORK TO SERVE A USER EQUIPMENT (UE) OVER A USER PLANE FUNCTION GROUP (UPFG)

(71) Applicant: T-Mobile Innovations LLC, Overland Park, KS (US)

(72) Inventors: Lyle T. Bertz, Lee's Summit, MO (US); Robert Keith Butler, Overland Park, KS (US); Laurent Alexandre Laporte, Spring Hill, KS (US); Tracy Lee Nelson, Overland Park, KS (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 79 days.

(21) Appl. No.: 17/204,326

(22) Filed: Mar. 17, 2021

(51) Int. Cl.
| | | |
|---|---|---|
| *H04L 29/12* | (2006.01) | |
| *H04W 76/25* | (2018.01) | |
| *H04W 28/12* | (2009.01) | |
| *H04W 12/80* | (2021.01) | |
| *H04W 12/033* | (2021.01) | |
| *H04W 84/04* | (2009.01) | |

(52) U.S. Cl.
CPC ......... *H04W 76/25* (2018.02); *H04W 12/033* (2021.01); *H04W 12/80* (2021.01); *H04W 28/12* (2013.01); *H04W 84/042* (2013.01)

(58) Field of Classification Search
CPC ..... H04L 29/12; H04L 12/66; H04L 61/4511; H04L 2101/375; H04L 67/565; H04L 67/1001; H04L 67/289; H04L 69/40; H04L 67/51; H04W 88/16; H04W 8/26; H04W 64/00; H04W 76/11; H04W 92/02; H04W 64/003; H04B 7/0413

USPC .......................................................... 370/329
See application file for complete search history.

(56) References Cited

U.S. PATENT DOCUMENTS

| | | | |
|---|---|---|---|
| 10,462,840 | B2 | 10/2019 | Dao et al. |
| 10,772,005 | B2 * | 9/2020 | Yan .......................... H04L 47/20 |
| 10,785,820 | B2 * | 9/2020 | Salkintzis ............. H04W 76/16 |
| 10,812,977 | B2 | 10/2020 | Li et al. |
| 11,116,028 | B2 * | 9/2021 | Salkintzis ............. H04W 36/14 |
| 11,129,212 | B2 * | 9/2021 | Benson .................. H04M 15/66 |
| 11,140,618 | B1 * | 10/2021 | Malhotra ............... H04W 48/17 |
| 11,146,528 | B2 * | 10/2021 | Bertz ........................ H04L 67/51 |
| 11,202,236 | B2 * | 12/2021 | Srivastava .............. H04L 69/22 |
| 11,310,868 | B2 * | 4/2022 | Myhre ................ H04L 67/1004 |

(Continued)

FOREIGN PATENT DOCUMENTS

| | | |
|---|---|---|
| WO | 2017219895 A1 | 12/2017 |
| WO | 2018070436 A1 | 4/2018 |

*Primary Examiner* — Man U Phan

(57) ABSTRACT

A wireless communication network serves a User Equipment (UE) over multiple User Plane Function Groups (UPFGs). In the wireless communication network, a Session Management Function (SMF) receives UPFG performance metrics from the wireless communication network. The SMF identifies a Packet Data Flow Group (PDFG) for the UE. The SMF responsively selects one of the UPFGs for the PDFG based on the UPFG performance metrics. The selected UPFG comprises at least three User Plane Functions (UPFs) and the PDFG comprises at least two Packet Data Flows (PDFs). The SMF transfers network signaling to the selected UPFG to deliver the PDFG to the UE. The selected UPFG receives the network signaling and responsively exchanges user data for the UE to deliver the PDFG.

20 Claims, 10 Drawing Sheets

(56) References Cited

U.S. PATENT DOCUMENTS

| | | | |
|---|---|---|---|
| 11,350,474 B2* | 5/2022 | Salkintzis | H04W 76/15 |
| 11,368,881 B1* | 6/2022 | Cai | H04W 36/0016 |
| 11,374,983 B1* | 6/2022 | Malhotra | H04L 65/1016 |
| 11,375,417 B1* | 6/2022 | Thantharate | H04W 36/0072 |
| 2019/0166647 A1 | 5/2019 | Velev et al. | |
| 2020/0367297 A1 | 11/2020 | Dao et al. | |
| 2021/0099943 A1* | 4/2021 | Dannebro | H04W 36/0011 |
| 2021/0152615 A1* | 5/2021 | Karampatsis | H04W 40/22 |
| 2021/0329485 A1* | 10/2021 | Han | H04W 28/0967 |
| 2021/0392572 A1* | 12/2021 | Thantharate | H04W 8/24 |
| 2021/0410010 A1* | 12/2021 | Salkintzis | H04W 76/10 |
| 2022/0046484 A1* | 2/2022 | Örtenblad | H04L 67/63 |

\* cited by examiner

US 11,602,003 B1

WIRELESS COMMUNICATION NETWORK TO SERVE A USER EQUIPMENT (UE) OVER A USER PLANE FUNCTION GROUP (UPFG)

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have Radio Access Networks (RANs) which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores. The RANs are connected to the wireless network cores over backhaul data links.

The RANs comprise Radio Units (RUs), Distributed Units (DUs) and Centralized Units (CUs). The RUs are mounted at elevation and have antennas, modulators, signal processor, and the like. The RUs are connected to the DUs which are usually nearby network computers. The DUs handle lower wireless network layers like the Physical Layer (PHY) and Media Access Control (MAC). The DUs are connected to the CUs which are larger computer centers that are closer to the network cores. The CUs handle higher wireless network layers like the Radio Resource Control (RRC) and Packet Data Convergence Protocol (PDCP). The CUs are coupled to network functions in the network cores. The network cores execute the network functions to provide wireless data services to the wireless user devices over the RANs. Exemplary network functions include Access and Mobility Management Functions (AMFs), Session Management Functions (SMFs), User Plane Functions (UPFs), and Network Repository Functions (NRFs).

A wireless user device attaches to a wireless network core over a RAN. The wireless user device transfers a session request to the wireless network core. The session comprises a data connection between the wireless user device and an external data network. In the wireless network core, an SMF retrieves UPF selection criteria from an NRF. The selection criteria indicates individual UPF metrics for individual UPFs. The SMF selects a UPF for the session based on its individual UPF metrics. The SMF uses the selected UPF to establish the session between the wireless user device and the external data network. Different types of UPFs support different types of sessions. When the wireless user device requests a new session that is not supported by the selected UPF, the SMF will select a new UPF to establish the new session. The wireless network core ineffectively handles session requests from the wireless user device and inefficiently requires the SMF to select a new UPF when the selected UPF does not support the requested session. Unfortunately, wireless network cores do not effectively and efficiently mitigate the effects of unsupported sessions.

TECHNICAL OVERVIEW

A wireless communication network serves a User Equipment (UE) over multiple User Plane Function Groups (UPFGs). In the wireless communication network, a Session Management Function (SMF) receives UPFG performance metrics from the wireless communication network. The SMF identifies a Packet Data Flow Group (PDFG) for the UE. The SMF responsively selects one of the UPFGs for the PDFG based on the UPFG performance metrics. The selected UPFG comprises at least three User Plane Functions (UPFs) and the PDFG comprises at least two Packet Data Flows (PDFs). The SMF transfers network signaling to the selected UPFG to deliver the PDFG to the UE. The selected UPFG receives the network signaling and responsively exchanges user data for the UE to deliver the PDFG.

DETAILED DESCRIPTION

Figure 1:
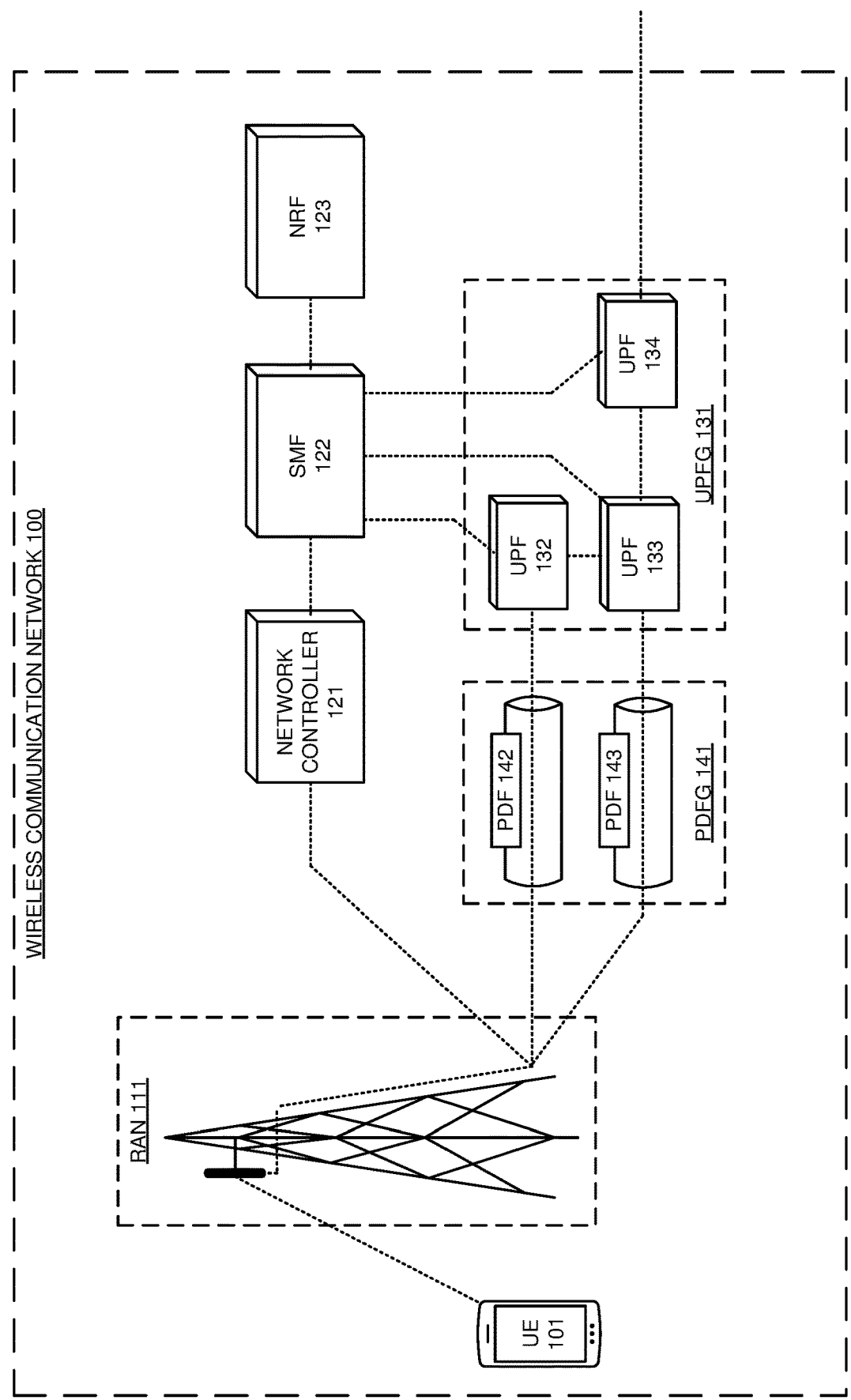
FIG. 1 illustrates a wireless communication network to serve a User Equipment (UE) over multiple User Plane Function Groups (UPFGs).

FIG. 1 illustrates wireless communication network 100 to serve User Equipment (UE) 101 over multiple User Plane Function Groups (UPFGs). Wireless communication network 100 delivers services to UE 101 like internet-access, machine communications, media-streaming, or some other wireless communications product. Wireless communication network 100 comprises UE 101, Radio Access Network (RAN) 111, network controller 121, Session Management Function (SMF) 122, Network Repository Function (NRF) 123, UPFG 131, and Packet Data Flow Group (PDFG) 141. UPFG 131 comprises UPFs 132-134. PDFG 141 comprises PDFs 142-143.

Various examples of network operation and configuration are described herein. In some examples, SMF 122 receives UPFG performance metrics from wireless communication network 100. SMF 122 identifies PDFG 141 for UE 101. SMF 122 responsively selects UPFG 131 for PDFG 141 based on the UPFG performance metrics. For example, the UPFG performance metric may indicate that UPFG 131 comprises a low latency UPFG and SMF 122 may select UPFG 131 based on the low latency performance metric. SMF 122 transfers network signaling to UPFG 131 to deliver PDFG 141 to UE 101. In response to the network signaling, UPFG 131 exchanges user data for UE 101 to deliver PDFG 141. Advantageously, SMF 122 efficiently selects UPFGs and effectively delivers multiple PDFs to UE 101. Moreover, SMF 122 effectively and efficiently mitigates the effects of unsupported data sessions.

UE 101 and RAN 111 communicate over links using wireless technologies like Fifth Generation New Radio (5GNR), Long Term Evolution (LTE), Low-Power Wide Area Network (LP-WAN), Institute of Electrical and Electronic Engineers (IEEE) 802.11 (WIFI), Bluetooth, and/or some other type of wireless networking protocol. The wireless technologies use electromagnetic frequencies in the low-band, mid-band, high-band, or some other portion of the electromagnetic spectrum. RAN 111, network functions 121-123, and UPFG 131 communicate over various links that use metallic links, glass fibers, radio channels, or some other communication media. The links use Fifth Generation Core (5GC), IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UE 101 comprises a computer, phone, vehicle, sensor, robot, or some other type of data appliance with wireless and/or wireline communication circuitry. RAN 111 is depicted as a tower but RAN 111 may use another mounting structure or no mounting structure at all. RAN 111 may comprise Fifth Generation (5G) RANs, LTE RANs, gNodeBs, eNodeBs, NB-IoT access nodes, LP-WAN base stations, wireless relays, WIFI hotspots, ENET access nodes, Bluetooth access nodes, and/or other wireless or wireline network transceivers. UE 101 and RAN 111 comprise antennas, amplifiers, filters, modulation, analog/digital interfaces, microprocessors, software, memories, transceivers, bus circuitry, and the like. Network controller 121 comprises network functions like Access and Mobility Management functions (AMFs). PDFG 141 comprises multiple PDFs that transport user data for data sessions like Protocol Data Unit (PDU) sessions. UPFG 131 comprises at least three UPFs and PDFG 141 comprises at least two PDFs. Network functions 121-123 and UPFG 131 comprise, microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
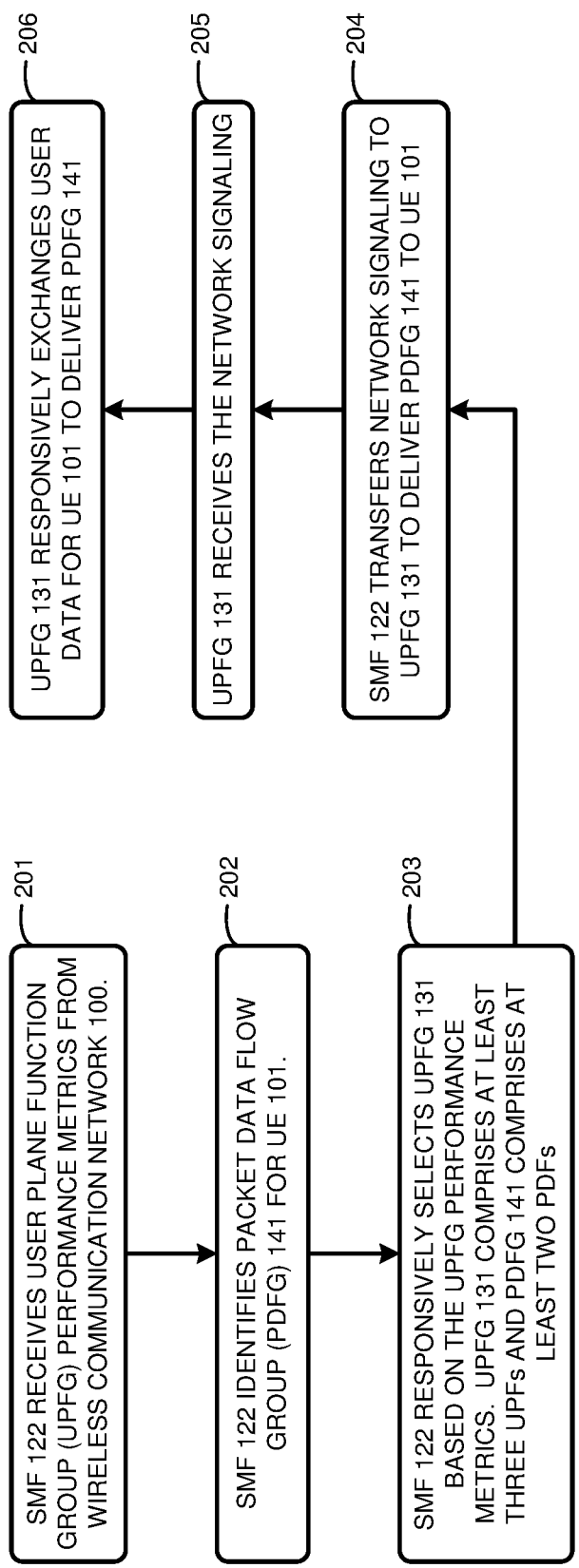
FIG. 2 illustrates an exemplary operation of the wireless communication network to serve the UE over multiple UPFGs.

FIG. 2 illustrates an exemplary operation of wireless communication network 100 to serve a PDU session type over RAN 111. The operation may vary in other examples. SMF 122 receives UPFG performance metrics from wireless communication network 100 (201). SMF 122 identifies PDFG 141 for UE 101 (202). For example, SMF 122 may receive a request from UE 101 to establish a PDU session over multiple PDFs and responsively identify PDGF 141. In response to the identification, SMF 122 selects UPFG 131 based on the UPFG performance metrics (203). UPFG 131 comprises at least three UPFs and PDFG 141 comprises at least two PDFs (203). SMF 122 transfers network signaling to UPFG 131 to deliver PDFG 141 to UE 101 (204). UPFG 131 receives the network signaling (205). UPFG 131 responsively exchanges user data for UE 101 to deliver PDFG 141 (206).

Figure 3:
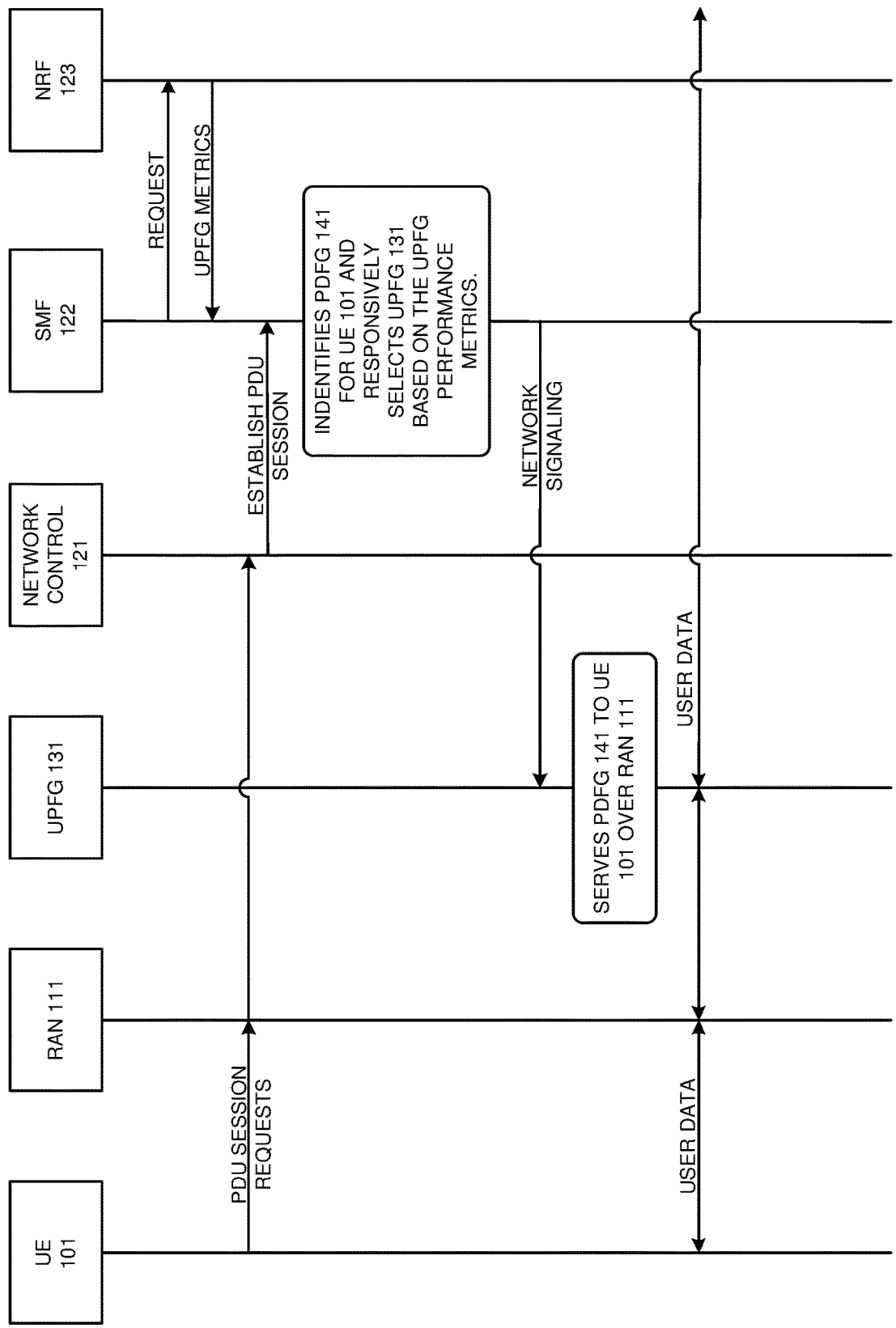
FIG. 3 illustrates another exemplary operation of the wireless communication network to serve the UE over multiple UPFGs.

FIG. 3 illustrates an exemplary operation of wireless communication network 100 to serve UE 101 over multiple UPFGs. The operation may vary in other examples. SMF 122 transfers a request for UPFG metrics for multiple UPFGs to NRF 123. The UPFG metrics indicate latency, throughput, or other UPFG metrics for UPFs that comprise the UPFGs. NRF 123 transfers the requested UPFG metrics to SMF 122. UE 101 transfers Protocol Data Unit (PDU) session requests to network controller 121 over RAN 111. The Protocol Data Unit (PDU) session requests indicate a multi-PDF requirement. In response to the PDU session requests, network controller 121 directs SMF 122 to establish the PDU sessions for UE 101.

SMF 122 identifies PDFG 141 to establish the PDU session for UE 101. For example, SMF 122 may identify that the PDU sessions utilize PDF 142 for a first session type and PDF 143 for a second session type. In response to the identification, SMF 122 selects UPFG 131 based on the UPFG metrics. SMF 122 transfers network signaling to UPFG 131 to deliver PDFG 141 to UE 401 for the PDU session. For example, the network signaling may configure UPFs 122-124 of UPFG 131 to deliver PDFG 141 to UE 401. UPFG 131 serves PDFG 141 for the PDU sessions to UE 101 over RAN 111. UE 101 exchanges user data with RAN 111. RAN 111 exchanges the user data with UPFG 131. UPFG 131 exchanges the user data with external systems.

Figure 4:
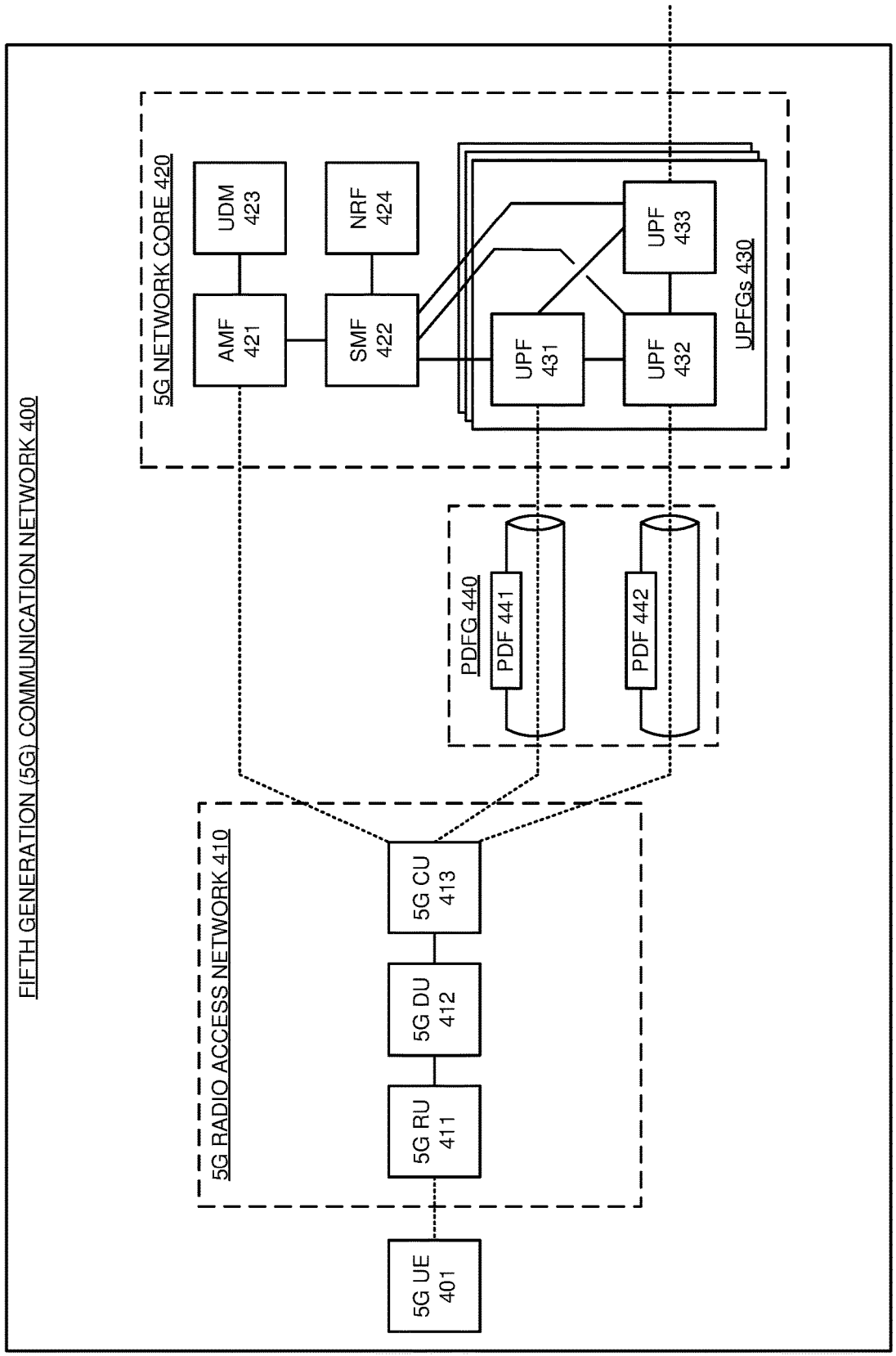
FIG. 4 illustrates a Fifth Generation (5G) communication network to serve a 5G UE over multiple UPFGs.

FIG. 4 illustrates Fifth Generation (5G) communication network 400 to serve 5G UE 401 over multiple User Plane Function Groups (UPFGs). 5G communication network 400 comprises an example of wireless communication network 100, although network 100 may differ. 5G communication network 400 comprises 5G UE 401, 5G RAN 410, 5G network core 420, and Packet Data Flow Group (PDFG) 440. 5G RAN 410 comprises 5G Radio Unit (RU) 411, 5G Distributed Unit (DU) 412, and 5G Centralized Unit (CU) 413. 5G network core 420 comprises Access and Mobility Management Function (AMF) 421, Session Management Function (SMF) 422, Unified Data Management (UDM) 423, Network Repository Function (NRF) 424, and User Plane Function Groups (UPFGs) 430. UPFGs 430 comprises User Plane Functions (UPFs) 431-433. PDFG 440 comprises Packet Data Flows (PDFs) 441-442. Other network functions and network elements are typically present in network core 420 but are omitted for clarity.

UE 401 wirelessly attaches to RU 411 and transfers attachment signaling to CU 413 over RU 411 and DU 412. CU 413 transfers a registration request for UE 401 to AMF 421. AMF 421 interacts with other network functions to authenticate and authorize UE 401 for wireless data services. Responsive to the authentications and authorizations, AMF 421 requests UE context for UE 401 from UDM 423. UDM 423 transfers the UE context for UE 401 to AMF 421. The UE context comprises Quality-of-Service (QoS) metrics, user subscription information, slice identifiers, network addresses, and the like. AMF 421 transfers the UE context for UE 401 to CU 413. CU 413 transfers the UE context to UE 401 over DU 412 and RU 411. CU 413 controls DU 412 and RU 411 to serve UE 401.

UE 401 transfers PDU session requests to CU 413 over DU 412 and RU 411 to establish multiple PDU sessions over 5G network core 420. The PDU session requests indicate a multi-PDF requirement. For example, one of the PDU sessions may require UPF that supports a low-latency PDF while another one of the PDU sessions may require a UPF that can support a high throughput PDF. CU 413 transfers the PDU session requests to AMF 421. AMF 421 approves the PDU session requests based on the UE context for UE 401. AMF 421 directs SMF 422 to establish the PDU sessions for UE 401. SMF 422 identifies that the PDU session requests require multiple PDFs. In response, SMF 422 queries NRF 424 to retrieve UPFG performance metrics for UPFGs 430. The performance metrics indicate UPFG latency, throughput, capabilities, and/or other metrics for UPFGs 430. NRF 424 stores UPFG performance metrics for UPFGs 430. NRF 424 receives the request from SMF 422 and responsively transfers the UPFG performance metrics to SMF 422. SMF 422 identifies the PDF types for PDFs 441-442 and responsively determines that PDFG 440 can be used for the PDU sessions requested by UE 401. In response, SMF 422 queries NRF 424 for UPFG IDs. NRF 424 stores the UPFG IDs and responsively transfers the UPFG IDs for UPFGs 430 to SMF 422. SMF 422 selects a UPFG from UPFGs 430 for UE 401 based on the performance metrics for UPFGs 430 and the required PDF types for the PDU sessions. In some examples, SMF 422 selects a UPFG from UPFGs 430 based on other metrics like UE Identifier (ID), Data Network Name (DNN), Public Land Mobility Network (PLMN) ID, slice ID, and/or some other metric.

SMF 422 identifies individual UPF functionalities for UPFs 431-433. The individual UPF functionalities for UPFs 431-433 comprise border security, cryptography, edge processing, packet inspection, emergency, lawful intercept, and/or some other type of UPF functionality. SMF 422 implements a function graph for UPFs 431-433 to serve UE 401 based on the individual functionalities of UPFs 431-433. The function graph indicates data routing pathways and UPF arrangements for UPFs 431-433 of the selected one of UPFGs 430. For example, UPFs 431-432 may comprise packet inspection UPFs while UPF 433 may comprise a border security UPF, and SMF 422 may determine data routes through the selected one of UPFGs 430 based on the individual functionalities of UPFs 431-433. SMF 422 transfers network signaling to UPFs 431-433 in the selected one of UPFGs 430 to deliver PDFG 440 to UE 401 for the PDU sessions. In some examples, SMF 422 may transfer the network signaling to a controlling one of UPFs 431-433 and the controlling one of UPFs 431-433 may route the network signaling to subordinate ones of UPFs 431-433.

SMF 422 transfers session context to AMF 421 to initiate the PDU sessions for UE 401. The session context indicates network addresses for UPFs 431-433 for UE 401 to use to initiate the PDU sessions. AMF 421 transfers the session context for UE 401 to CU 413. CU 413 transfers the session context to UE 401 over DU 412 and RU 411. UE 401 uses the session context to establish the PDU sessions. UPFs 431-433 of the selected one of UPFGs 430 exchange user data with external systems. UPFs 431-433 exchange user data for the PDU session in PDFG 440 with CU 413. CU 413 exchanges user data for the PDU sessions with UE 401 over DU 412 and RU 411.

In some examples, SMF 422 generates UPFGs 430. SMF 422 retrieves the UPFG metrics and UPF IDs for multiple UPFs from NRF 424. SMF 422 selects individual UPFs based on the UPFG metrics and UPF IDs to form UPFGs 430. For example, the UPFG metrics may indicate that UPFs 431-433 are low-latency UPFs that are geographically close and in response, SMF 422 may form a UPFG that comprises UPFs 431-433. SMF 422 configures the routing pathways in formed UPFGs based on the individual functionalities of the constituent UPFs. For example, SMF 422 may determine that a constituent UPF of the formed UPFG comprises border security functionality, and SMF 122 may configure that UPF within the formed UPFG to receive data from external data networks. The routing configuration of the constituent UPFs in the formed UPFG comprises a UPF function graph. The UPF function graph comprises a subset of the Virtual Network Function (VNF) forwarding graph used by 5G network core 420.

Figure 5:
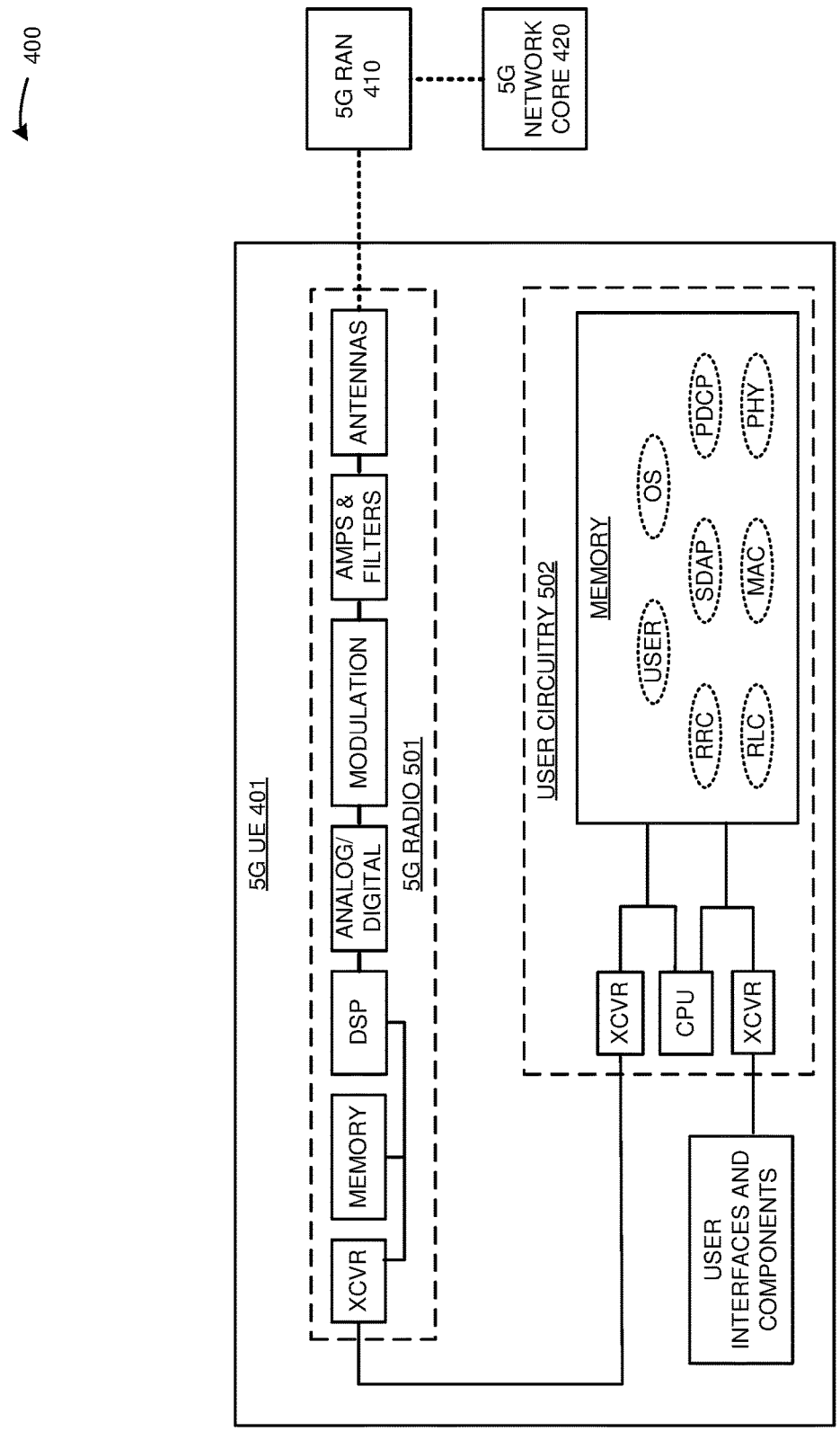
FIG. 5 illustrates the 5G UEs in the 5G communication network.

FIG. 5 illustrates 5G UE 401 that is served over multiple UPFGs in 5G communication network 400. UE 401 comprises an example of UE 101, although UE 101 may differ. UE 401 comprises 5G radio 501 and user circuitry 502. Radio 501 comprises antennas, amplifiers, filters, modulation, analog-to-digital interfaces, Digital Signal Processors (DSP), memory, and transceivers that are coupled over bus circuitry. User circuitry 502 comprises memory, CPU, user interfaces and components, and transceivers that are coupled over bus circuitry. The memory in user circuitry 502 stores an operating system (OS), user applications (USER), and 5GNR network applications for Physical Layer (PHY), Media Access Control (MAC), Radio Link Control (RLC), Packet Data Convergence Protocol (PDCP), Service Data Adaptation Protocol (SDAP), and Radio Resource Control (RRC). The antenna in radio 501 is wirelessly coupled to 5G RAN 510 over a 5GNR link. A transceiver in radio 501 is coupled to a transceiver in user circuitry 502. A transceiver in user circuitry 502 is typically coupled to the user interfaces and components like displays, controllers, and memory.

In radio 501, the antennas receive wireless signals from 5G RAN 410 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 502 over the transceivers. In user circuitry 502, the CPU executes the network applications to process the 5GNR symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data.

In radio 501, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 410 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid ARQ (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

Figure 6:
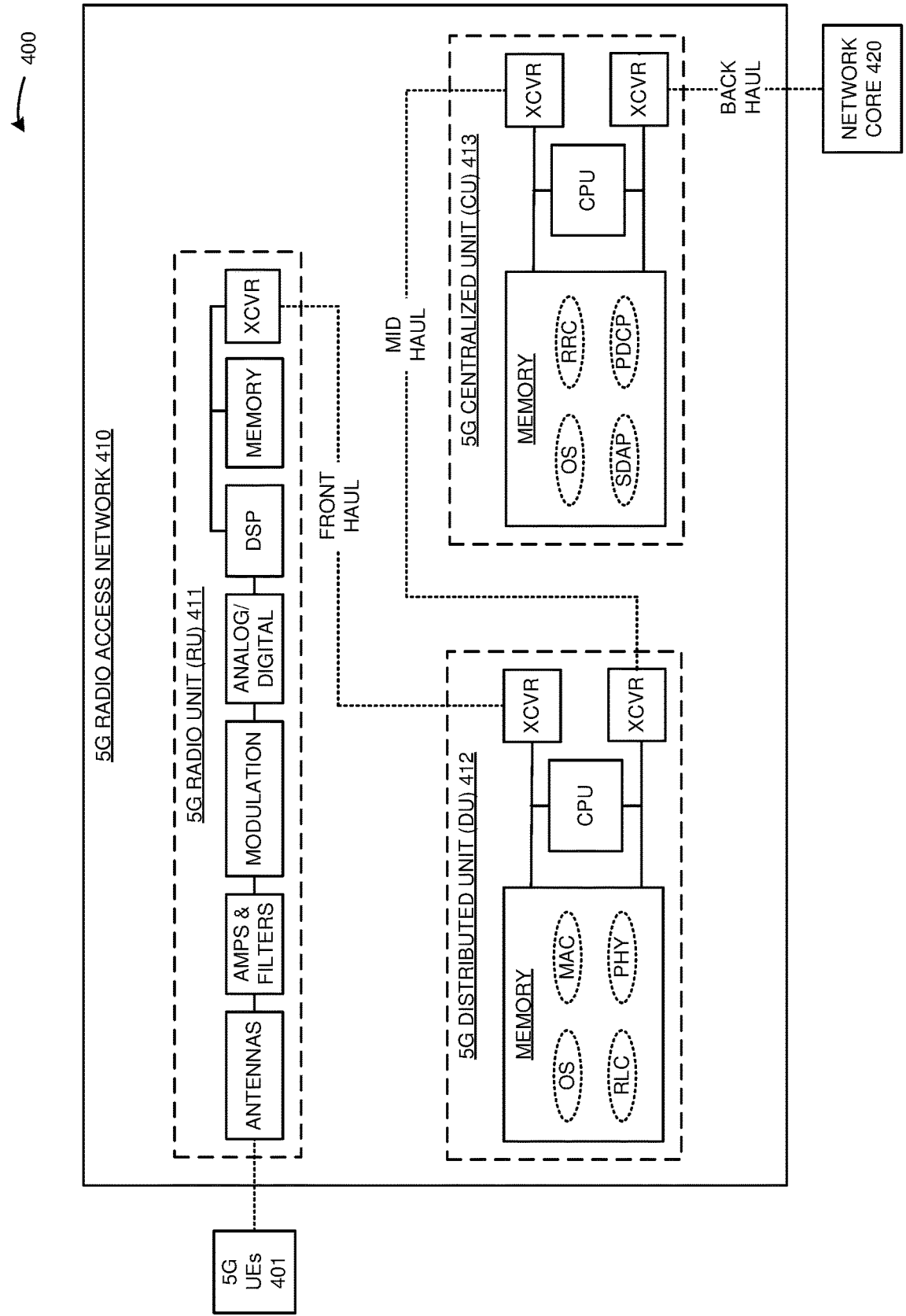
FIG. 6 illustrates a 5G RAN in the 5G communication network.

FIG. 6 illustrates 5G RU 411, 5G DU 412, and 5G CU 413 that serve a PDU session type to UE 401. RU 411, DU 412, and CU 413 comprise an example of RAN 111, although RAN 111 may differ. RU 411 comprises antennas, amplifiers, filters, modulation, analog-to-digital interfaces, DSP, memory, and transceivers (XCVRs) that are coupled over bus circuitry. UE 401 are wirelessly coupled to the antennas in RU 411 over 5GNR links. Transceivers in 5G RU 411 are coupled to transceivers in 5G DU 412 over fronthaul links like enhanced Common Public Radio Interface (eCPRI). The DSP in RU 411 executes its operating system and radio applications to exchange 5GNR signals with UE 401 and to exchange 5GNR data units with DU 412.

For the uplink, the antennas receive wireless signals from UE 401 that transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies. The analog/digital interfaces convert the demodulated analog signals into digital signals for the DSP. The DSP transfers corresponding 5GNR symbols to DU 412 over the transceivers.

For the downlink, the DSP receives downlink 5GNR symbols from DU 412. The DSP processes the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5G UE 401 that transport the downlink 5GNR signaling and data.

DU 412 comprises memory, CPU, and transceivers that are coupled over bus circuitry. The memory in 5G DU 412 stores operating systems and 5GNR network applications like PHY, MAC, and RLC. CU 413 comprises memory, CPU, and transceivers that are coupled over bus circuitry. The memory in CU 413 stores an operating system and 5GNR network applications like PDCP, SDAP, and RRC. A transceiver in 5G DU 412 is coupled to a transceiver in RU 411 over front-haul links. A transceiver in DU 412 is coupled to transceivers in CU 413 over mid-haul links. A transceiver in CU 413 is coupled to network core 420 over backhaul links.

RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs. PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

Figure 7:
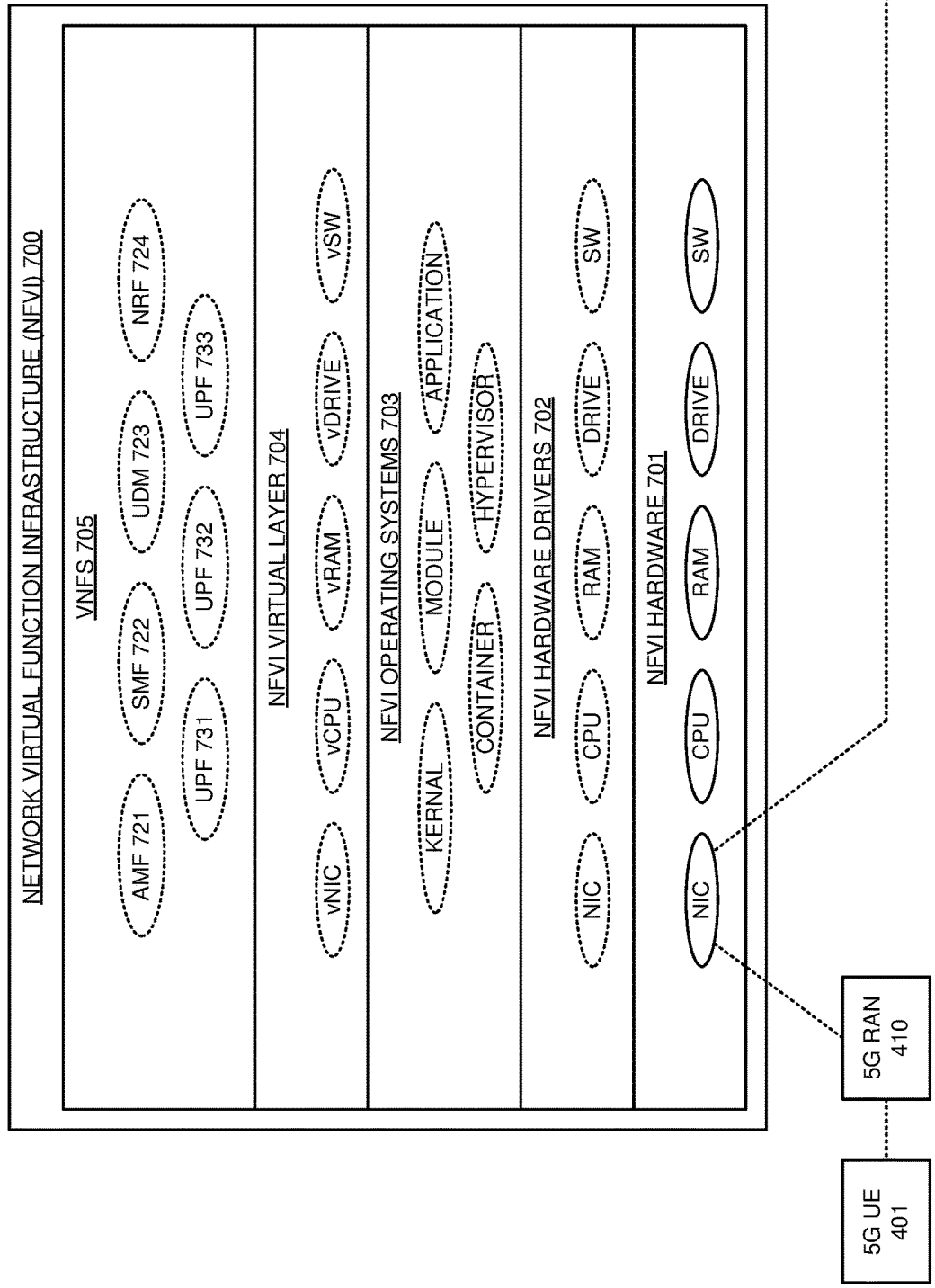
FIG. 7 illustrates a Network Function Virtualization Infrastructure (NFVI) in the 5G communication network.

FIG. 7 illustrates Network Function Virtualization Infrastructure (NFVI) 700. NFVI 700 comprises an example of network functions 121-123 and 132-134, although functions 121-124 and 132-134 may vary from this example. NFVI 700 comprises Network Function Virtualization Infrastructure (NFVI) hardware 701, NFVI hardware drivers 702, NFVI operating systems 703, NFVI virtual layer 704, and NFVI Virtual Network Functions (VNFs) 705. NFVI hardware 701 comprises Network Interface Cards (NICs), CPU, RAM, Flash/Disk Drives (DRIVE), and Data Switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises vNIC, vCPU, vRAM, vDRIVE, and vSW. NFVI VNFs 705 comprise AMF 721, SMF 722, UDM 723, NRF 724, and UPFs 731-733. Other VNFs and network elements like Authentication Server Function (AUSF), Policy Control Function (PCF), Network Slice Selection Function (NSSF), Unified Data Registry (UDR), and Network Exposure Function (NEF) are typically present but are omitted for clarity. NFVI 700 may be located at a single site or be distributed across multiple geographic locations. The NIC in NFVI hardware 701 is coupled to 5G RAN 410 and to external systems. NFVI hardware 701 executes NFVI hardware drivers 702, NFVI operating systems 703, NFVI virtual layer 704, and NFVI VNFs 705 to form AMF 421, SMF 422, UDM 423, NRF 424, and UPFs 431-433.

Figure 8:
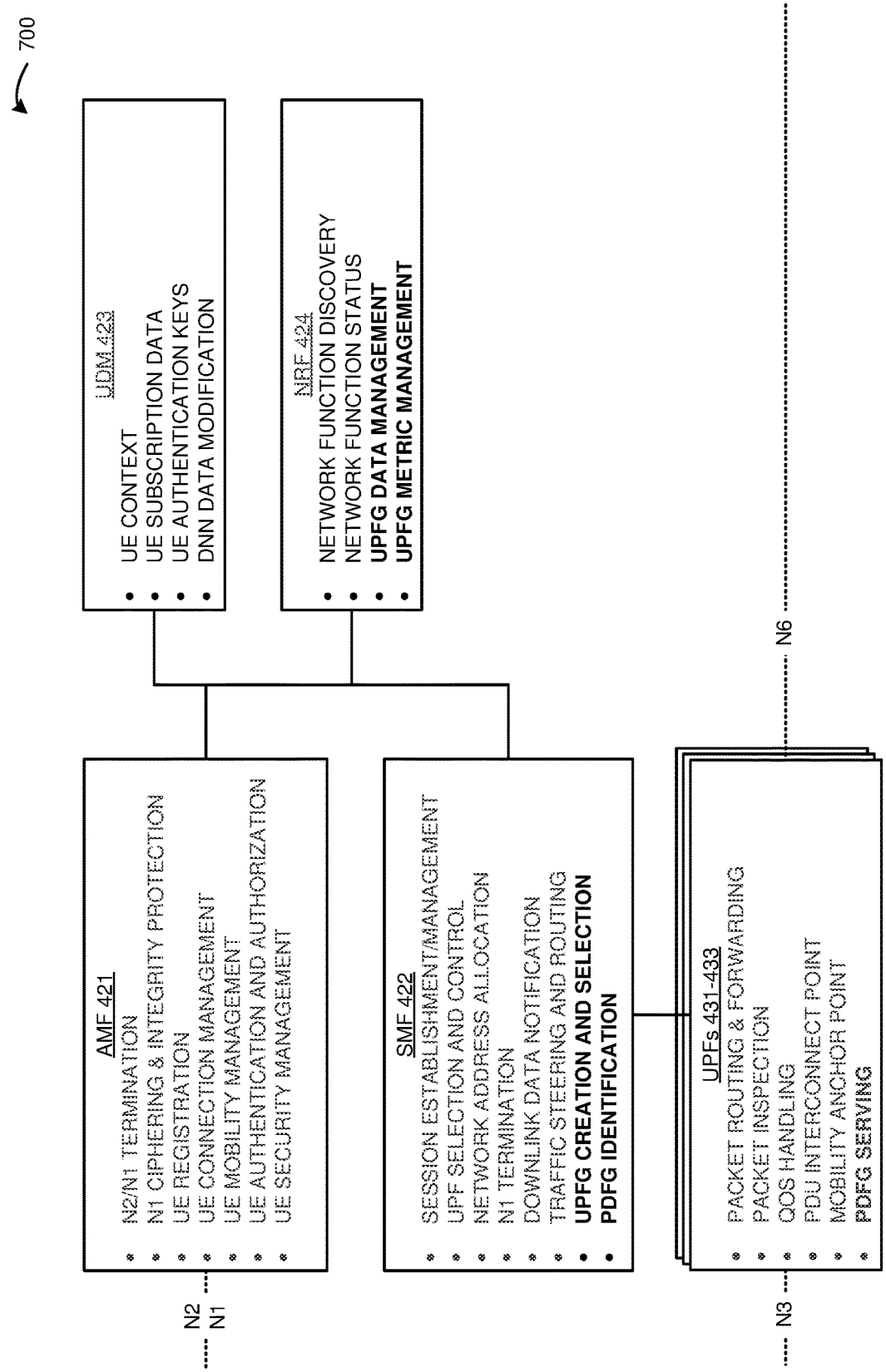
FIG. 8 further illustrates the NFVI in the 5G communication network.

FIG. 8 further illustrates NFVI 700 in 5G communication network 400. ANMF 421 perfonns N2 terrnination, N1 termination, Ui ciphering & integrity protection, UE registration and connection, UE connection/mobility rnanagenient, UE authentication and authorization, and UE security management. SMF 422 performs session establishment and management, UPF selection and control, network address allocation, N1 termination, downfink data notificatioii, and traffic steering and routing, UPFG creation and selection, and PDFG identification, UDM 423 performs UE context nanagement, UE subscription management, UE authentication key storage, and DNN data modification. NRF 424 performs network function discovery, network function status monitoring, UPFG data management, and UPFG metric management. UPFs 431-433 perform packet routing & forwarding, packet inspection, QoS handling, PDU interconnection, mobility anchoring, and PDFG serving.

In this example, SMF 422 uses UPFGs 430 to deliver PDFG 440 to UE 401 to establish a low latency PDU session and a high throughput PDU session, however in other examples, SMF 422 may establish different types of PDU sessions for UE 401. UE 401 attaches to AMF 421 over RAN 410. AMF 421 receives PDU session requests from UE 401 to establish an Ultra Reliable Low Latency Communications (URLLC) PDU session and a high throughput media streaming PDU session. AMF 421 approves the PDU session requests and directs SMF 422 to establish the PDU sessions for UE 401. SMF 422 identifies that the PDU session requests require a low-latency PDF and a high throughput PDF. In response, SMF 422 queries NRF 424 to retrieve UPFG performance metrics for UPFGs 430. NRF 424 receives the query from SMF 422 and responsively transfers the UPFG performance metrics to SMF 422. SMF 422 identifies that PDF 441 comprises a low latency PDF and that PDF 442 comprises a high throughput PDF. SMF 422 determines that PDFG 440 can be used for the PDU sessions requested by UE 401. SMF 422 queries NRF 424 for UPFG IDs. NRF 424 responsively transfers the UPFG IDs for UPFGs 430 to SMF 422. SMF 422 selects a low-latency/high throughput UPFG from UPFGs 430 for UE 401 based on the performance metrics for UPFGs 430 and the required PDF types for the PDU sessions.

SMF 422 identifies individual UPF functionalities for UPFs 431-433. SMF 422 determines that UPF 431 comprises a low-latency functionality, UPF 432 comprises a high throughput functionality, and UPF 433 comprises edge processing and packet inspection functionality. SMF 422 implements a function graph for UPFs 431-433 to serve UE 401 based on the individual functionalities of UPFs 431-433. The function graph configures UPF 431 to handle the low-latency PDF, configures UPF 432 to handle the high throughput PDF, and configures UPF 433 to manage data exchange between external data networks and UPFs 431-432. SMF 422 transfers network signaling to UPFs 431-433 in the selected one of UPFGs 430 to deliver PDFG 440 to UE 401 for the PDU sessions.

SMF 422 transfers session context to AMF 421 to initiate the PDU sessions for UE 401. AMF 421 transfers the session context for UE 401 to over 5G RAN 410. The selected one of UPFGs 430 exchanges user data for the PDU sessions with UE 401 over RAN 410 and using PDFG 440. UPF 431 exchanges low latency user data in PDFG 440 to UE 401 for the URLLC PDU session. UPF 432 exchanges high throughput user data in PDFG 440 to UE 401 for the high throughput media streaming PDU session with UE 410. UPF 433 exchanges the user data with external data systems.

Figure 9:
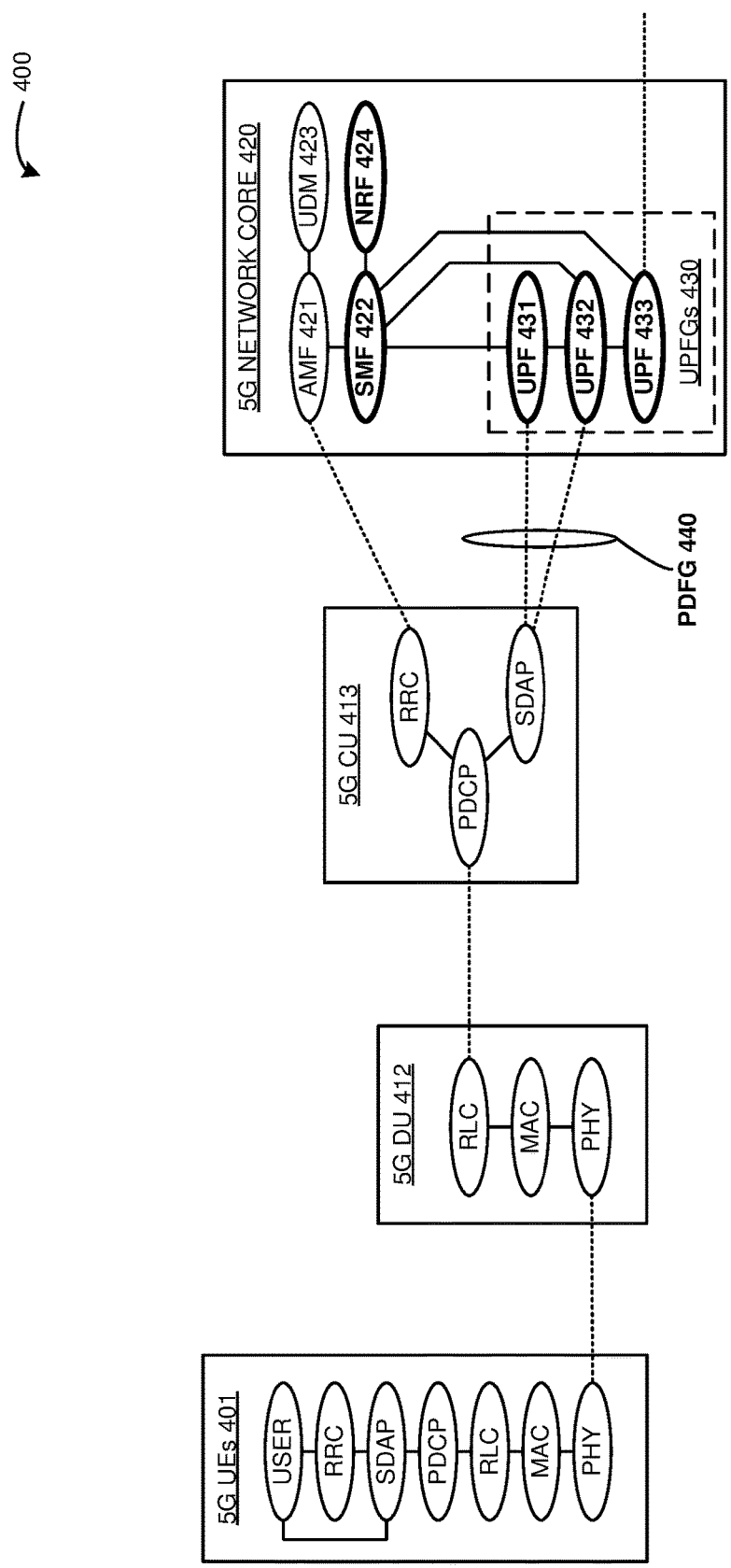
FIG. 9 illustrates an exemplary operation of the 5G communication network to serve the 5G UE over multiple UPFGs.

FIG. 9 illustrates an exemplary operation of 5G communication network 400 to serve UE 401 over UPFGs 430. The operation may vary in other examples. In this example, SMF 422 uses UPFGs 430 to deliver PDFG 440 to UE 401 to establish a low latency PDU session and an online gaming PDU session, however in other examples, SMF 422 may establish different types of PDU sessions for UE 401.

The RRC in UE 401 wirelessly attaches to the RRC in CU 413 over the PDCPs, RLCs, MACs, and PHYs. The RRC in CU 413 transfers a registration request for UE 401 to AMF 421. AMF 421 interacts other network functions to authenticate and authorize UE 401 for wireless data services. Responsive to the authentications and authorizations, AMF 421 retrieves UE context for UE 401 from UDM 423. AMF 421 transfers the UE context for UE 401 to the RRC in CU 413. The RRC in CU 413 transfers the UE context to the RRC in UE 401 over the PDCPs, RLCs, MACs, and PHYs. The RRC in CU 413 controls the SDAP, PDCP, RLC, MAC, and PHY in CU 413 and DU 412 to serve UE 401. The RRCs in UE 401 exchange user signaling with the RRC in CU 413 over the PDCPs, RLCs, MACs, and PHYs. The RRC in CU 413 exchanges the user signaling with AMF 421 and SMF 422.

User applications in UE 401 execute and the RRC in UE 401 responsively transfers PDU session requests for a URLLC PDU session and an online gaming PDU session to the RRC in CU 413 over the PDCPs, RLCs, MACs, and PHYs. The RRC in CU 413 transfers the PDU session requests to AMF 421. AMF 421 determines UE 401 is subscribed for the requested PDU sessions and responsively directs SMF 422 to establish the PDU sessions for UE 401. In response, SMF 422 queries NRF 424 to retrieve UPFG performance metrics for UPFGs 430. NRF 424 responsively transfers the UPFG performance metrics to SMF 422. SMF 422 identifies PDFG 440. SMF 422 determines PDF 441 comprises a low latency PDF and that PDF 442 comprises an online gaming PDF. SMF 422 queries NRF 424 for UPFG IDs. NRF 424 transfers the UPFG IDs for UPFGs 430 to SMF 422. SMF 422 selects a low-latency and online gaming UPFG from UPFGs 430 for UE 401 based on the performance metrics for UPFGs 430 and the PDF types of PDFG 440.

SMF 422 identifies individual UPF functionalities for UPFs 431-433. SMF 422 determines that UPF 431 comprises a low-latency functionality, UPF 432 comprises an online gaming functionality, and UPF 433 comprises border security and packet inspection functionality. SMF 422 implements a function graph for UPFs 431-433 to serve UE 401 based on the individual functionalities of UPFs 431-433. The function graph routes low latency data in PDFG 440 to UPF 431, routes online gaming data in PDFG 440 to UPF 432, and configures UPF 433 to manage data exchange between external networks and UPFs 431-432. SMF 422 transfers network signaling to UPFs 431-433 in the selected one of UPFGs 430 to establish the PDU sessions over PDFG 440 for UE 401.

SMF 422 transfers session context that indicates network addresses for UPFs 431-433 to AMF 421 to initiate the PDU sessions for UE 401. AMF 421 transfers the session context for UE 401 to the RRC in CU 413. The RRC in CU 413 transfers the session context to the RRC in UE 401 over the PDCPs, RLCs, MACs, and PHYs. The RRC in UE 401 uses the session context to establish the URLLC PDU session and the online gaming PDU session. The SDAP in UE 401 exchanges user data for the URLLC PDU session and the online gaming PDU session with the SDAP in CU 413 over the PDCPs, RLCs, MACs, and PHYs. The SDAP in CU 413 exchanges the low-latency user data in PDFG 440 with UPFs 431. The SDAP in CU 413 exchanges the online gaming user data in PDFG 440 with UPF 432. UPFs 431-432 exchange their user data with UPF 433. UPF 433 exchanges the user data with external systems.

Figure 10:
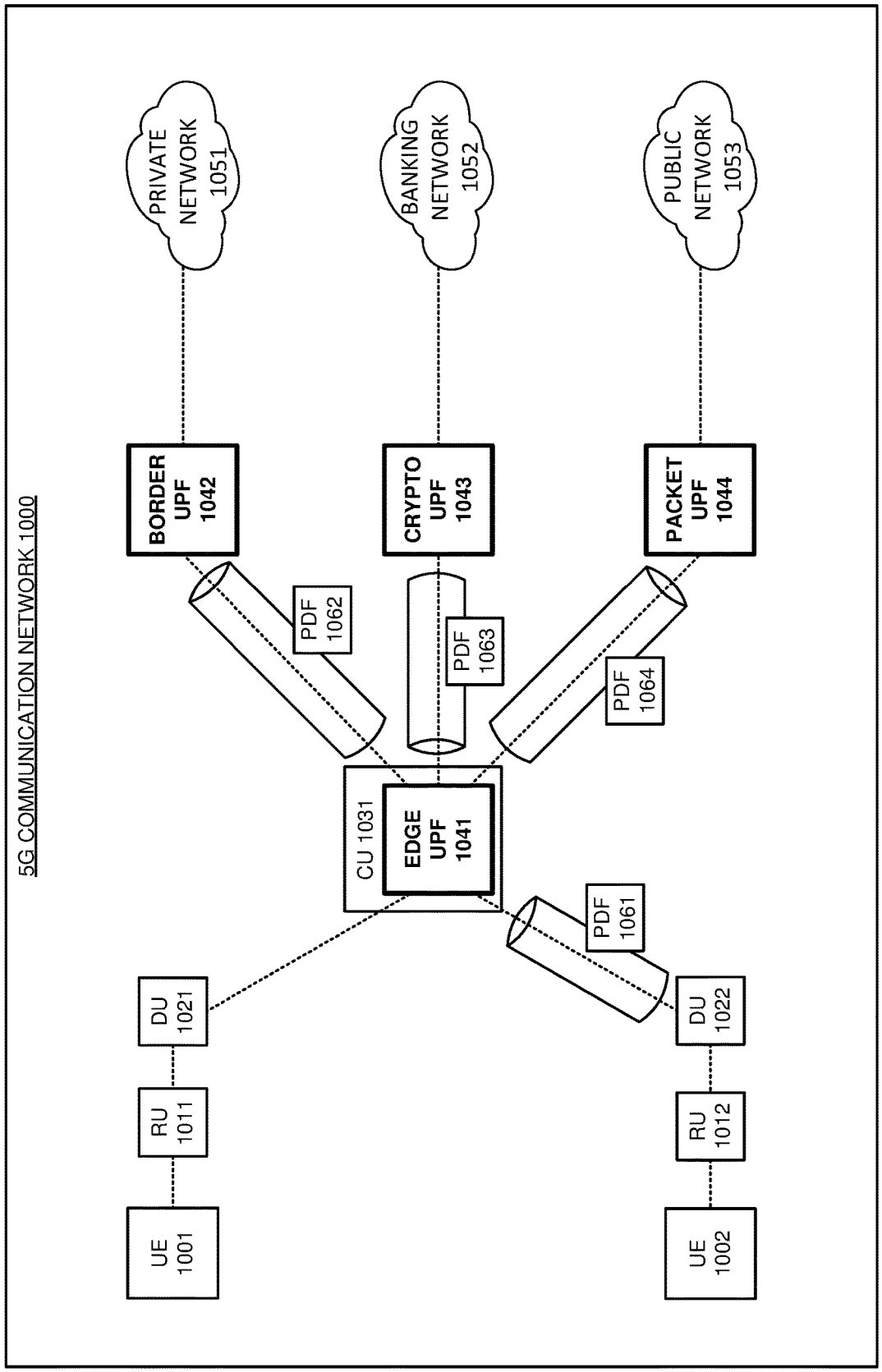
FIG. 10 illustrates Fifth Generation (5G) communication network to serve a 5G UE over multiple UPFGs.

FIG. 10 illustrates 5G communication network 1000 to serve UE 1001 over a User UPFG. 5G communication network 1000 comprises an example of wireless communication network 100, although network 100 may differ. 5G communication network 1000 comprises UEs 1001-1002, RUs 1011-1012, DUs 1021-1022, CU 1031, UPFs 1041-1044, networks 1051-1053, and PDFs 1061-1064. UPFs 1041-1444 comprises a UPFG that delivers a PDFG comprising PDFs 1061-1064 for UE 1001. Edge UPF 1041 comprises low-latency and edge processing functionality and resides in CU 1031. Border UPF 1042 comprises a border security functionality. Crypto UPF 1043 comprises encryption/decryption functionality. Packet UPF 1044 comprises deep packet inspection functionality. PDF 1061 comprises a low-latency link. PDF 1062 comprises a private network link. PDF 1063 comprises a financial data link. PDF 1064 comprises a public internet link. UPFs 1041-1044 route user data for PDU sessions established by UE 1001 to UE 1002 and to networks 1051-1053 based on PDF type for PDFs 1061-1064 and UPF functionality for UPFs 1041-1044.

UE 1001 establishes PDU sessions to exchange user data with UE 1002 and networks 1051-1053. UE 1001 transfers user data for a low latency PDU session with UE 1002 to edge UPF 1041. Edge UPF 1041 associates the low latency PDU session with PDF 1061 based on the PDF type for PDF 1061. Edge UPF 1041 responsively routes the user data for the low latency PDU session to UE 1002 over DU 1022 and RU 1012.

UE 1001 transfers user data for a private network PDU session to edge UPF 1041. Edge UPF 1041 associates the user data for the private network PDU session with PDF 1062 based on the PDF type for PDF 1062. Edge UPF 1041 associates the PDF type of PDF 1062 with the UPF functionality of border UPF 1042. Edge UPF 1041 routes the user data for the private network PDU session to border UPF 1042 in PDF 1062. Border UPF 1042 routes the user data for the private network PDU session to private network 1051.

UE 1001 transfers user data for a financial PDU session to edge UPF 1041. Edge UPF 1041 associates the user data for the financial PDU session with PDF 1063 based on the PDF type for PDF 1063. Edge UPF 1041 associates the PDF type of PDF 1063 with the UPF functionality of crypto UPF 1043. Edge UPF 1041 routes the user data for the financial PDU session to crypto UPF 1043 in PDF 1063. Crypto UPF 1043 routes the user data for the financial PDU session to banking network 1052.

UE 1001 transfers user data for a public network PDU session to edge UPF 1041. Edge UPF 1041 associates the user data for the public network PDU session with PDF 1064 based on the PDF type for PDF 1064. Edge UPF 1041 associates the PDF type of PDF 1064 with the UPF functionality of packet UPF 1044. Edge UPF 1041 routes the user data for the public network PDU session to packet UPF 1044 in PDF 1064. Packet UPF 1044 routes the user data for the public network PDU session to public network 1053.

The wireless data network circuitry described above comprises computer hardware and software that form special-purpose network circuitry to serve a User Equipment (UE) over multiple User Plane Function Groups (UPFGs). The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve the UE over multiple UPFGs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a User Equipment (UE) over multiple User Plane Function Groups (UPFGs), the method comprising:
   a Session Management Function (SMF) receiving UPFG performance metrics from the wireless communication network;
   the SMF identifying a Packet Data Flow Group (PDFG) for the UE and responsively selecting one of the UPFGs for the PDFG based on the UPFG performance metrics wherein the selected UPFG comprises at least three User Plane Functions (UPFs) and the PDFG comprises at least two Packet Data Flows (PDFs);
   the SMF transferring network signaling to the selected UPFG to deliver the PDFG to the UE; and
   the selected UPFG receiving the network signaling and responsively exchanging user data for the UE to deliver the PDFG which comprises identifying UPF functions for the user data and routing the user data through the UPFG based on the identified UPF functions for the user data and based on individual functionalities of the at least three UPFs, and wherein the UPF functions and the individual functionalities comprise at least one of border security, cryptography, edge processing, packet inspection, emergency, and lawful intercept.

2. The method of claim 1 wherein the selected UPFG exchanging the user data for the UE to deliver the PDFG comprises identifying UPF functions for the user data and routing the user data through the UPFG based on the identified UPF functions for the user data and based on individual functionalities of the at least three UPFs.

3. The method of claim 1 further comprising the SMF generating the UPFGs.

4. The method of claim 1 further comprising the SMF retrieving at least three UPF Identifiers (IDs) for the at least three UPFs from a Network Repository Function (NRF) and generating the selected UPFG.

5. The method of claim 1 further comprising a Network Repository Function (NRF) storing UPFG Identifiers (IDs) for the multiple UPFGs, receiving a request for the selected UPFG from the SMF, and serving a UPFG Identifier (ID) for the selected UPFG to the SMF.

6. The method of claim 1 further comprising a Network Repository Function (NRF) receiving the UPFG performance metrics for the multiple UPFGs, storing the UPFG performance metrics, receiving a request for the UPFG performance metrics for the selected UPFG from the SMF, and serving the UPFG performance metrics for the selected UPFG to the SMF.

7. The method of claim 1 wherein the SMF selecting one of the UPFGs for the PDFG comprises selecting the UPFG based on a PDFG type for the PDFG.

8. The method of claim 1 wherein the SMF selecting one of the UPFGs for the PDFG comprises selecting the UPFG based on one of a UE Identifier (ID), a Data Network Name (DNN), a Public Land Mobility Network (PLMN) ID, and a slice ID.

9. The method of claim 1 wherein UPFG performance metrics comprise UPFG latency.

10. A wireless communication network to serve a User Equipment (UE) over multiple User Plane Function Groups (UPFGs), the wireless communication network comprising:
a Session Management Function (SMF) to receive UPFG performance metrics from the wireless communication network;
the SMF to identify a Packet Data Flow Group (PDFG) for the UE and responsively select one of the UPFGs for the PDFG based on the UPFG performance metrics wherein the selected UPFG comprises at least three User Plane Functions (UPFs) and the PDFG comprises at least two Packet Data Flows (PDFs);
the SMF to transfer network signaling to the selected UPFG to deliver the PDFG to the UE; and
the selected UPFG to receive the network signaling and responsively exchange user data for the UE to deliver the PDFG which comprises the SMF to identify UPF functions for the user data and route the user data through the UPFG based on the identified UPF functions for the user data and based on individual functionalities of the at least three UPFs, and wherein the UPF functions and the individual functionalities comprise at least one of border security, cryptography, edge processing, packet inspection, emergency, and lawful intercept.

11. The wireless communication network of claim 10 wherein the selected UPFG comprises the SMF to identify UPF functions for the user data and route the user data through the UPFG based on the identified UPF functions for the user data and based on individual functionalities of the at least three UPFs.

12. The wireless communication network of claim 10 further comprising the SMF to generate the UPFGs.

13. The wireless communication network of claim 10 further comprising the SMF to retrieve at least three UPF Identifiers (IDs) for the at least three UPFs from a Network Repository Function (NRF) and generate the selected UPFG.

14. The wireless communication network of claim 10 further comprising a Network Repository Function (NRF) to store UPFG Identifiers (IDs) for the multiple UPFGs, receive a request for the selected UPFG from the SMF, and serve a UPFG Identifier (ID) for the selected UPFG to the SMF.

15. The wireless communication network of claim 10 further comprising a Network Repository Function (NRF) to receive the UPFG performance metrics for the multiple UPFGs, store the UPFG performance metrics, receive a request for the UPFG performance metrics for the selected UPFG from the SMF, and serve the UPFG performance metrics for the selected UPFG to the SMF.

16. The wireless communication network of claim 10 wherein the SMF is to select the UPFG based on a PDFG type for the PDFG.

17. The wireless communication network of claim 10 wherein the SMF is to select the UPFG based on one of a UE Identifier (ID), a Data Network Name (DNN), a Public Land Mobility Network (PLMN) ID, and a slice ID.

18. The wireless communication network of claim 10 wherein UPFG performance metrics comprise UPFG latency.

19. The method of claim 1 wherein the UE comprises a vehicle.

20. The wireless communication network of claim 10 wherein the UE comprises a vehicle.

* * * * *